(12) United States Patent
Candela et al.

(10) Patent No.: US 6,959,265 B1
(45) Date of Patent: Oct. 25, 2005

(54) USER-CENTRIC MEASUREMENT OF QUALITY OF SERVICE IN A COMPUTER NETWORK

(75) Inventors: Eric Eva Candela, Bandol (FR); Marc Duthoit, Bandol (FR); Blaise Andreo, Six Fours (FR); Stéphane Tosoni, La Garde (FR); Jean-Noël Le Roux, Saint Cloud (FR)

(73) Assignee: Serden Technologies, Inc., Northbrook, IL (US)

( * ) Notice: Subject to any disclaimer, the term of this patent is extended or adjusted under 35 U.S.C. 154(b) by 122 days.

(21) Appl. No.: 10/680,048

(22) Filed: Oct. 7, 2003

(51) Int. Cl.[7] .............................................. G06F 11/30
(52) U.S. Cl. ...................... 702/186; 702/182; 709/220; 709/223; 370/254; 370/351
(58) Field of Search ..................... 702/186, 182–183; 709/200, 232, 220, 223, 224; 370/254, 351–352, 370/462, 400

(56) References Cited

U.S. PATENT DOCUMENTS 6,144,855 A * 11/2000 Slovin ...................... 455/432.1
6,580,981 B1 * 6/2003 Masood et al. ................ 701/29
6,754,188 B1 * 6/2004 Garahi et al. ................ 370/328
6,785,513 B1 * 8/2004 Sivaprakasam ............ 455/63.1

* cited by examiner

Primary Examiner—Michael Nghiem
Assistant Examiner—Hien Vo
(74) Attorney, Agent, or Firm—Daspin & Aument, LLP; Jefferson Perkins

(57) ABSTRACT

In a business network environment, each workstation or information access point (IAP) has installed thereon a quality of service (QoS) module to monitor the IAP's performance. The QoS module declares exceptions when it perceives that one or more of a predetermined plurality of functions or conditions of the computer has entered into a state indicative of degraded performance. At the time that an exception is declared, a snapshot is taken of the software applications running on the IAP, the amount of resources that they are using, and presence or absence of the user. As used in calculating a QoS index representative of the operational state of the IAP, exceptions are weighted to take into account the relative importance of these exceptions and the users which they affect. Because the QoS indices are time-normalized, they may be aggregated or compared across the network by an IT administrator.

76 Claims, 10 Drawing Sheets

| FACTOR | USER TYPE 1 | USER TYPE 2 | USER TYPE 3 |
|---|---|---|---|
| EVENT TYPE | | | |
| -CPU | 1.0 | 1.0 | 0.5 |
| -MEMORY | 1.0 | 1.0 | 0.5 |
| -NETWORK | 0.5 | 1.5 | 1.0 |
| -I/O | 1.0 | 1.0 | 1.0 |
| -RESPONSE TIME | 1.2 | 1.2 | 2.0 |
| USER | | | |
| -PRESENT | 1.0 | 0.5 | 1.0 |
| -ABSENT | 0.5 | 0.5 | 0.5 |
| TIME OF DAY | | | |
| -DURING BUSINESS HOURS | 1.0 | 1.0 | 1.0 |
| -AFTER BUSINESS HOURS | 0.2 | 0.2 | 0.5 |
| -PRIME TIME | 1.5 | 2.0 | 2.0 |
| DAY | | | |
| -WORK DAY | 1.0 | 1.0 | 1.0 |
| -HOLIDAY | 0.2 | 0.2 | 1.0 |
| -WEEKEND | 0.5 | 1.0 | 1.0 |
| APPLICATION TYPE | | | |
| -SYSTEM | 1.0 | 1.0 | 1.0 |
| -SYSTEM CRITICAL | 2.0 | 1.0 | 1.0 |
| -USER | 1.0 | 1.0 | 1.0 |
| -USER CRITICAL | 1.5 | 3.0 | 3.0 |

| FACTOR | YELLOW | ORANGE | RED |
|---|---|---|---|
| CPU | PRIVILEGE STATE>20% >30 SEC OR USER STATE>80%>1 MIN | PRIVILEGE STATE>30% >2 MIN OR USER STATE>90%>5 MIN | PRIVILEGE OR USER STATE 100%>1 MIN |
| MEMORY | 80%>1 MIN | 80%>2 MIN | 100%>30 SEC |
| I/O | 30%>1 MIN | 70%>2 MIN | 90%>30 SEC |
| PRINTING | BLOCKED>2 MIN | BLOCKED>5 MIN | SPOOLER UNAVAILABLE |
| DISK SPACE | <30% FREE | <20% FREE | <10% FREE |
| APPLICATION CRASH | N/A | APPLICATION HUNG>2 MIN | APPLICATION HUNG >5 MIN OR CRASHED |
| SYSTEM CRASH | A SERVICE THAT SHOULD BE ON IS OFF | A SERVICE HUNG>2 MIN | A SERVICE HUNG>5 MIN OR SERVICE CRASHED |
| RESPONSE TIME | >5 SEC | >15 SEC | >30 SEC |
| LOG EVENTS | PREDEFINED MESSAGE NUMBERS | WARNING MESSAGE OR PREDEFINED MESSAGE NUMBERS | ERROR MESSAGE OR PREDEFINED MESSAGE NUMBERS |
| NETWORK | THROUGHPUT REDUCED 50%>5 MIN | THROUGHPUT REDUCED 80%>5 MIN | NETWORK UNAVAILABLE |
| USER INPUT | USER SELECTS YELLOW | USER SELECTS ORANGE | USER SELECTS RED |

*FIG. 8*

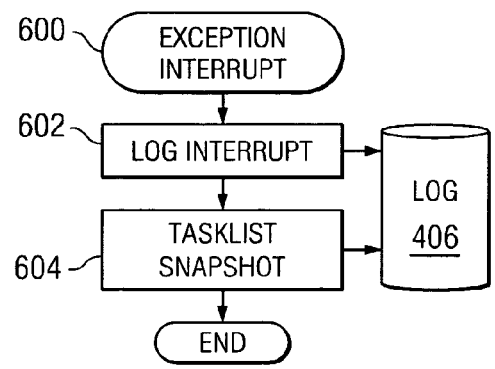

*FIG. 9*

USER-CENTRIC MEASUREMENT OF QUALITY OF SERVICE IN A COMPUTER NETWORK

TECHNICAL FIELD OF THE INVENTION

The present invention relates in general to methods and apparatus for the monitoring and assessment of computer system performance, and more particularly for a system and method for user-centric measurement of quality of service in a computer network.

BACKGROUND OF THE INVENTION

Computer networks of e.g. businesses have several to thousands of users, and concomitantly several to thousands of workstations or other information access points (IAPs). Information Technology (IT) professionals typically are tasked with maintaining and enhancing the operability of each computer on the system. Traditionally, network performance has been assessed by measuring resources which are common across the network, such as network load, application response time and server activity. From these measurements, the service level of end users has been inferred. These traditional, server-centric level-of-service measures may still not given an accurate picture of IAP operability as experienced by individual users.

SUMMARY OF THE INVENTION

The present invention provides methods, apparatus, systems and prerecorded media for measuring and assessing the quality of service (QoS) at each of a plurality of information access points (IAPs), such as workstations, preferably in a network. The QoS at any IAP and for any predetermined period of time is preferably represented as a single numeric QoS index. QoS indices are also preferably calculated for certain ones of the software applications running on the IAP. Metrics for the quality of service for an entire network, or of groups of the IAPs thereon, can be calculated as a function of the user-centric QoS indices. The QoS application indices can likewise be combined to obtain network- or group-wide measurements of application performance.

According to one aspect of the invention, the QoS index for an IAP is calculated by a QoS application or module, preferably resident on the IAP, as a function of several factors, the identities and weights of which are set according to an operational user (OU) profile. Each user on the network is assigned one of a predetermined plurality of OU profiles according to the user's responsibilities in the enterprise.

In a further aspect of the invention, the QoS module observes the operation of the IAP for the occurrence of any of a number of predetermined exceptions to normal performance. These exceptions can be of various kinds and severities. For each one of several computer functions or conditions, performance criteria are established for each of several states. A "green", or normal, state has no criteria associated with it, but the rest of the states—indicative of progressively degraded degrees of performance—have predetermined stored criteria associated with them. For example, an exception may be declared based on processor usage, memory usage, printer access, or input/output rate. An exception will also be declared if an IAP application hangs or crashes, the entire IAP hangs or crashes, or network resources become unavailable. In a preferred embodiment, different weights are accorded these different exceptions according to their identities, the identity of the user associated with the IAP, the length of time during which the exception occurred, the time of day or day of week during which the exception occurred, the severity of the sensed problem, and/or the particular application for which the exception was noted. The QoS index or indices is/are calculated as a function of these weighted exceptions.

In one embodiment, the QoS module yields a QoS index and state or color indicating the relative performance of the IAP. A range of colors may be used, such as green (completely operational), yellow (slightly degraded), orange (degraded), red (not usable) and black (crashed or frozen). The QoS index and IAP state can be monitored over time to determine changes in state and trends in performance.

In a still further aspect of the invention, the QoS module includes a user attendance probe which senses whether the user is present at the time the exception occurred. Exceptions occurring while the user is present are preferably given more weight in the QoS index calculation than exceptions occurring when the user is not there.

In yet another aspect of the invention, termed by the inventors "responsibility tracking", the QoS module takes a snapshot of the IAP at the time that the exception occurred, recording the identities of the software applications, or more particularly application processes (some applications can be several processes running in parallel), then running on th IAP. The snapshot and other data concerning the type and importance of the exception are recorded in a log. Preferably the contents of the log are periodically uploaded to a master (such as may be mounted on a QoS server for a network to which the IAP is connected) on a periodic basis. The network administrator is able to discern patterns of performance based on which applications were running during the periods for which the exceptions were recorded. The QoS module also includes logic to determine, by measurement of the relative use of one or more system resources (such as memory usage), which of the running software applications are the top candidates for having caused the exception.

In a still further aspect of the invention, the QoS system is heuristic in that software application performance history is used to determine current expected performance norms for the applications, and these in turn are used to determine an amount of deviation from such norms that will be tolerated before an exception is declared.

The present invention is technically advantageous in that it takes a user-centric approach to measure the performance of day-to-day operations and to evaluate the effects of changes to the environment such as workload increases, the addition of new applications and modifications to the network. The present invention bases its assessment on service criteria from individual user perspectives and uses metrics to quantify the service level experienced by the user. The present invention provides a heuristic modeling of applications in order to detect variations from the standard. It uses the detection of user presence at a workstation to more accurately weight the effect of performance variations and introduces the assignment of responsibility for performance problems to activities at the workstation.

BRIEF DESCRIPTION OF THE DRAWINGS

Further aspects of the invention and their advantages can be discerned in the following detailed description, in which like characters denote like parts and in which:

FIG. 8 is a table showing predetermined criteria for different states for a range of different computer functions or conditions in a representative operational user (OU) profile;

FIG. 9 is a flow diagram showing steps in an exception capture process according to the invention;

DETAILED DESCRIPTION

Figure 1:
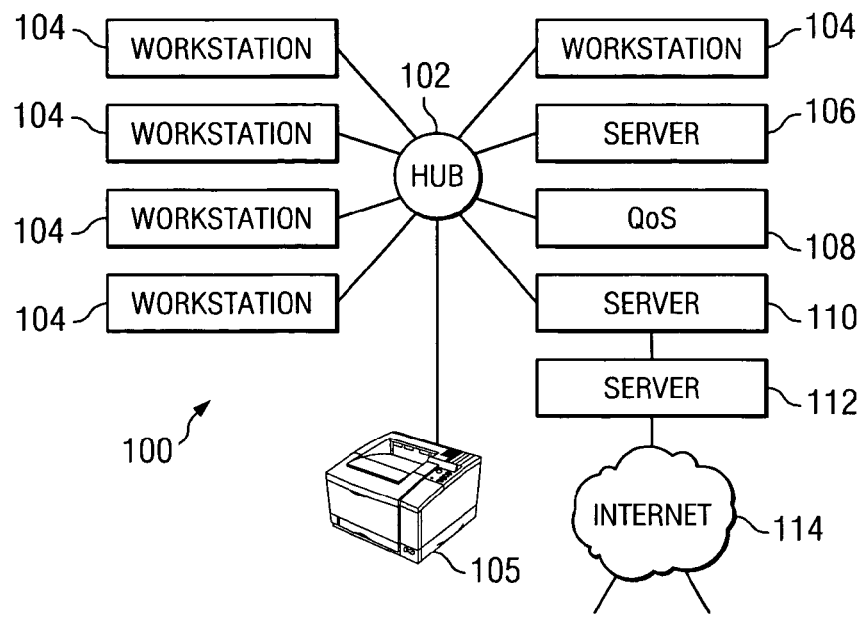
FIG. 1 is a schematic diagram of a computer network employing the invention.

While the present invention could have utility on a standalone computer, it is optimally deployed on workstations and server(s) in a network, a representative one of which is indicated generally at 100 in FIG. 1. The illustrated network 100 is a local area network (LAN) although the invention has application to wide area networks (WANs) up to and including the Internet. The illustrated network 100 is in a star topology, wherein each node connects to a hub, router or switch or combination thereof 102, and employs the Ethernet communications protocol. Other topologies and other network communication protocols could alternatively be adopted for use with the invention, such as bus or ring topologies. The Quality of Service assessment tool according to the invention is independent of the networking topology (ring, star, bus), transmission medium (coax, optical fiber, twisted pair, wireless), access method (carrier sense, token passing), protocol (Ethernet, Token Ring, FDDI, ISDN, ATM, Frame Relay, ARCnet) or technology (LAN, WAN), and will function equally as well on a network having any particular combination of these characteristics.

The network includes a plurality of workstations 104, one, more or all of which alternatively could be more limited sorts of user information access points (IAPs) such as desktops, laptops or even PDAs. A representative five workstations 104 are shown, but a LAN could have as few as two and as many as hundreds or thousands. The network 100 will also have at least one server 106 and in many instances will have several such servers (examples of which are shown at 106, 108, 110, 112) that offer various network services and perform different collective functions for network 100. Servers 106–112 may be physically distinct or may be virtual divisions of fewer than the number of physical units shown. Network 100 can also have connected to it other network devices, represented here by exemplary printer 105.

A server 112, for example, may be tasked as an internet communications firewall to the Internet 114. A server 110 may be used as an email server and to host a web site or an entire application specific provider (ASP). Server 106 may include an array of hard drives or other mass storage units and may furnish data backup and auxiliary storage capabilities to the workstations 104. Server 106 also may host one or more software applications accessible by the users at workstations 104.

Important here is server 108, which, among its other possible functions, acts as a data aggregating and report generating server for the Quality of Service (QoS) system provided according to the invention. One of servers 106, 108, 110 could also act as a gateway to wireless handheld IAPs, from cell phones to PDAs. Any such gateway would be connected to a wireless transmitter (not shown).

Figure 2:
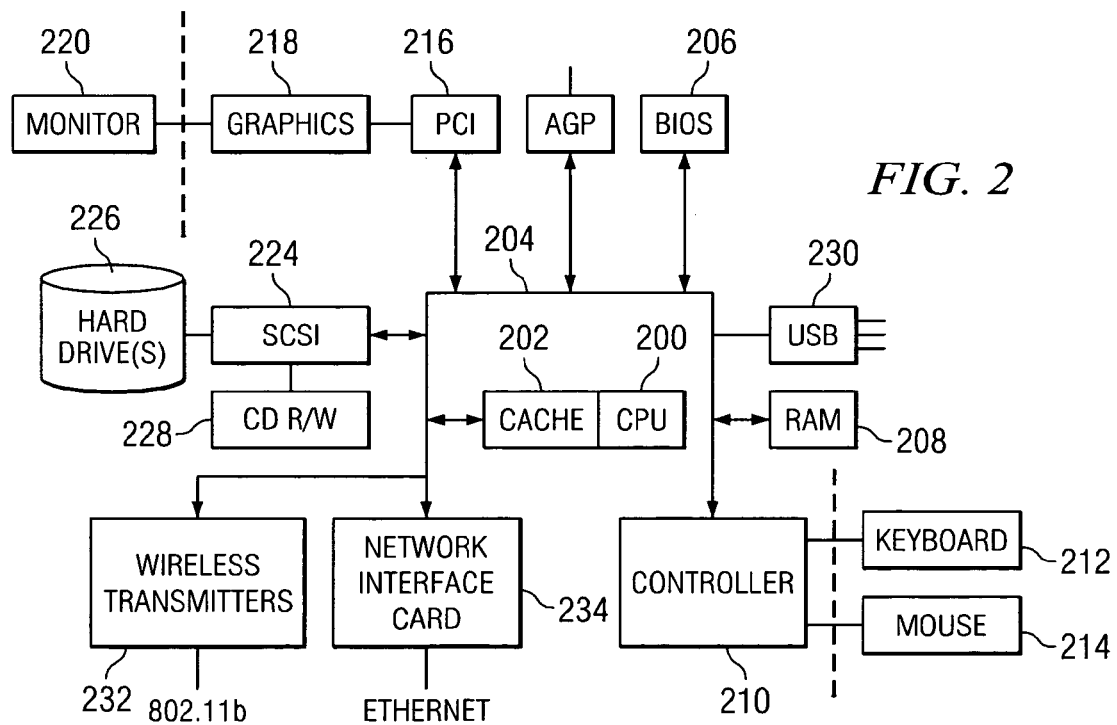
FIG. 2 is a high level schematic diagram of a representative workstation employing the invention and being a node in the network of FIG. 1.

A representative physical structure of one of the IAPs or workstations 104 is shown in FIG. 2. The workstation will have at least one CPU or processor 200. Workstation 104 could have a second or more processors and may have, in addition to representative CPU 200, a specialized coprocessor for mathematics, graphics or the like. Current microprocessor architecture places a memory cache 202 on-chip with the processor 200 for fast memory access. The CPU 200 is connected via two or more buses, here represented schematically by a single bus 204, but actually being made up by physical buses of varying speeds and instantiated by a chipset (not shown). The bus 204 communicates with a series of peripheral devices, some of which are internal to the workstation 104 and some of which are not.

For example, bus 204 will always communicate with a nonvolatile electronic memory unit 206, on which is loaded a basic input/output system or BIOS. Unit 206 typically is an EEPROM. Workstation 104 will likely have a large random access memory (RAM) unit 208 that may be distributed among several cards and/or chips.

There must be some method of communicating with a user, so workstation 104 will typically have a controller 210 which receives inputs from a keyboard 212, a mouse 214 and possibly other input devices. Of increasing importance and sophistication are the image(s) that are being displayed to the user, and this may be done through a PCI controller 216, which itself is in communication with one or more graphics cards 218 (each of which has dedicated processor and memory capability), each of which in turn controls what appears on at least one monitor 220 that typically is external to the CPU enclosure. Other sorts of internal communications protocols/controllers may be used, such as an AGP controller 222 for running other displays or graphics capabilities and a SCSI controller 224 for operating one or more magnetic hard drives 226, optical drives 228 or other peripheral I/O devices (not shown). The optical drive(s) 228 may be read or read/write and may include CD, DVD or both capabilities. Other kinds of mass storage are possible, such as tape drives, and hereinafter the inventors' reference to "disk" should be understood to refer to any mass storage unit from and to which data may be read and written.

Computers of recent vintage will have typically have many universal serial bus (USB) ports 230, a representative one of which is shown here. USB ports 230 may be used to connect to a keyboard, a mouse (both in replacement of controller 210), a printer (not shown; increasingly used in substitution for the older-style parallel port), PDAs, scanners, memory sticks and noncomputer components such as high-fidelity audio equipment or computer-controllable appliances.

Also in increasing use are wireless transmitters 232, such as those employing the IEEE 802.11 or IEEE 802.15 "wifi" wireless communications protocols, Bluetooth, or other wireless protocols. The illustrated, exemplary workstation 104 has a network interface card 234 for hardwire connection to the network 100, and in the illustrated embodiment is an Ethernet card. Nodes of the network 100 could also be connected to network printers (such as printer 105 in FIG. 1), scanners, fax machines and other network devices.

The user-centric quality of service (QoS) module 312 (FIG. 3) according to the invention measures the performance of certain components of the IAP 104 and the quality and volume of their communications with other nodes on network 100. Among other things, the QoS module, application or utility tracks usage of processor 200, usage of RAM 208, and input/output rates of data transmission to and from one or more illustrated peripherals, whether inside the workstation enclosure, immediately peripheral to it or connected through network 100. Traffic to and from hard drive or other mass storage unit 226 is of particular interest.

Illustrated workstation 104 and server 108 are general-purpose hardware components turned into special-purpose computers by executing instructions of several software programs loaded onto them. While software-programmable general-purpose computers are by far the most common practice as of the time of writing, hardwired, special-purpose computers are also a possibility. One or more of the functions of a computer 104 may alternatively be implemented by hardwired logic.

The present invention may be supplied in the form of computer programs on prerecorded media such as optical disks, electronic memories or magnetic media. These programs are read into RAM 208 or other memory and executed by CPU 200 as a portion of its execution cycle, in effect turning CPU 200 into a special-purpose processor which performs the QoS monitoring and assessment functions and the application metering functions described below. Alternatively software embodying the present invention may be downloaded from a server (such as server 108) to each IAP 104.

Figure 3:
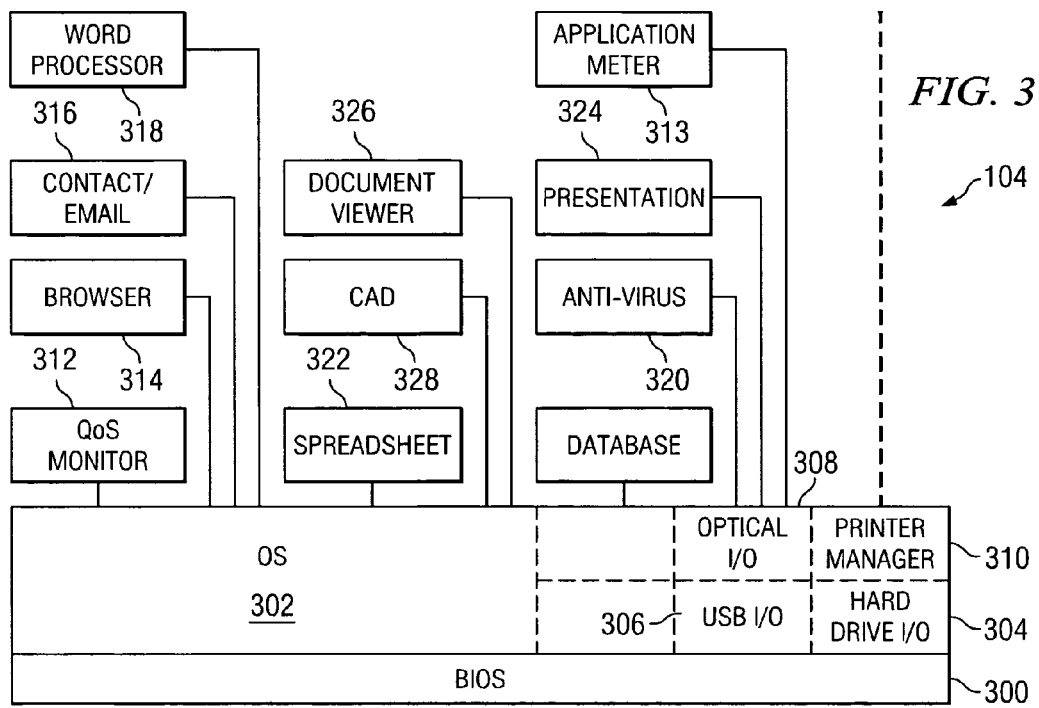
FIG. 3 is a schematic diagram of the architecture of the software installed on the workstation shown in FIG. 2.

FIG. 3 schematically shows the software architecture of the representative workstation 104 after booting up. The BIOS 300 is first loaded into RAM 208 upon bootup and this is followed by the main operating system (OS) 302. Such operating systems can be among the Microsoft Windows® family, the Apple®/MacIntosh® family, Unix®, Linux® or others. The operating system 302 at its most basic controls the input/output of the processor 200 and RAM 208 to each of the peripherals. As newer generations of operating systems have been introduced, they have gotten larger and have taken on more functionality. Important here is a typical current OS's responsibility for hard drive or other mass storage I/O 304, USB I/O 306, reads and writes from and to optical media 308, a print manager/spooler 310, reads from and writes to other objects, such as from and to other devices on the Ethernet network 100 or web sites on the Internet 114. The OS 302 also manages access to memory, and allocates CPU cycles to the various processes running on the IAP 104.

On top of the operating system 302 are software applications, some of which are meant to run all of the time and others of which are meant to be loaded only when the user selects them. A Quality of Service (QoS) software application or module 312 preferably runs all of the time and gathers data on the performance of the OS 302, and particularly its management of RAM 208, processor 200 usage, 110 operations and other characteristics as will be detailed below. An application meter 313 takes note of which other applications, and which processes of those applications (some applications may run two or more processes in parallel) are running on the workstation 104 and how much of the system resources these applications are using. These may include an internet browser 314, such as Netscape® or Microsoft® Internet Explorer®; an email/contact application 316, such as Microsoft® Outlook®; and a word processor 318, such as Corel® WordPerfect® or Microsoft® Word®. Typically running in the background is an Antivirus application 320, such as those provided by McAfee® and Norton®. Other user-selectable applications may include a spreadsheet application 322, such as Excel® or Quicken®; presentation software 324, such as Microsoft® Powerpoint®; a document viewer 326 such as Adobe® Acrobat®; and a computer assisted design application 328 such as AutoCad® or ProEngineer®. There are myriad other possible applications as represented by the dotted line. In a network environment, the network administrator typically will set policies concerning the use and presence of these software applications. Network administrators are interested in learning how these applications perform in their environments, individually and in conjunction with various combinations of other software, and the present invention provides a powerful diagnostic tool in analyzing their performance.

The industry has adopted a standard by which operating system 302 makes available, through various calls to operating system functions, certain metrics or variables by which system performance can be tracked. This standard is called Web Based Enterprise Management (WBEM) and Microsoft's version of this standard is called "WMI". QoS monitor 312 and application meter 313 take advantage of these standards.

While in the illustrated embodiment the QoS module 312 and application performance meter 313 are shown as software applications separate from the operating system 302, in other embodiments they can be integrated into the operating system 302.

Figure 4:
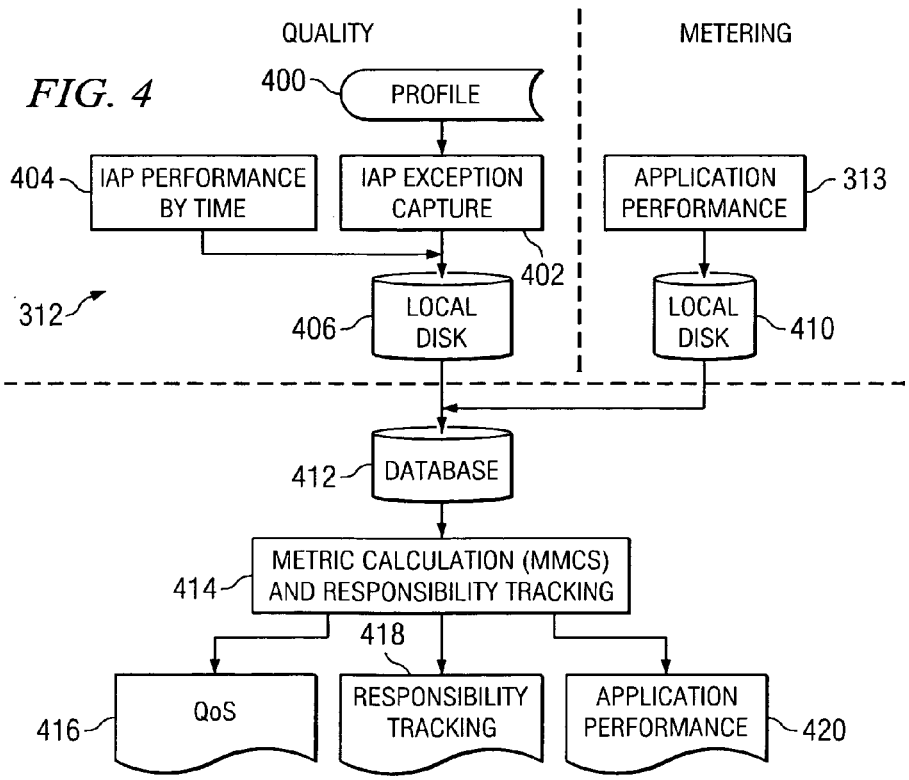
FIG. 4 is a flow diagram showing operation of the QoS assessment system according to the invention.

FIG. 4 is a flowchart of a system overview showing the operation of the QoS module and application performance meter according to the invention. Activities occurring at the local workstation or IAP 104 are shown above the dotted line. Activities occurring at the QoS server 108 are shown below the dotted line.

The QoS module 312 at the local IAP 104 monitors quality of IAP operation. A user profile 400, supplied to the workstation by the QoS server 108, is used as a record or basis against which present IAP performance is measured. IAP exception capture component 402 senses when any of a plurality of functions or conditions of the IAP enters into a degraded state of performance, predetermined criteria for which have been stored in OU profile 400. At that point, an exception is noted and is captured. Module 404 includes a quality of service (QoS) index calculator which calculates IAP and application QoS indices as normalized over the time periods for which these indices are calculated. Data concerning the exception and the QoS indices are recorded on local disk 406.

The application performance meter 313 meters the performance of each of the applications running on the workstation or other IAP. Measurements such as CPU usage, memory usage and I/O rates are captured by application performance meter 313 and stored at 410 in a local performance matrix. At predetermined intervals, such as once a day, the results of the QoS and metering activities of QoS module 312 and meter 313 are uploaded onto a database 412 of the QoS server 108. Logic 414 performs QoS metric calculations and compiles responsibility tracking from the data made available by database 412. As will be explained below, responsibility tracking identifies, from the applications which were running at the time that an exception occurred, likely candidates for exception causation. Preferably, module 414 makes at least three kinds of reports available to the system administrator: a QoS index 416, a responsibility tracking report 418, and application performance measurements 420.

Figure 5:
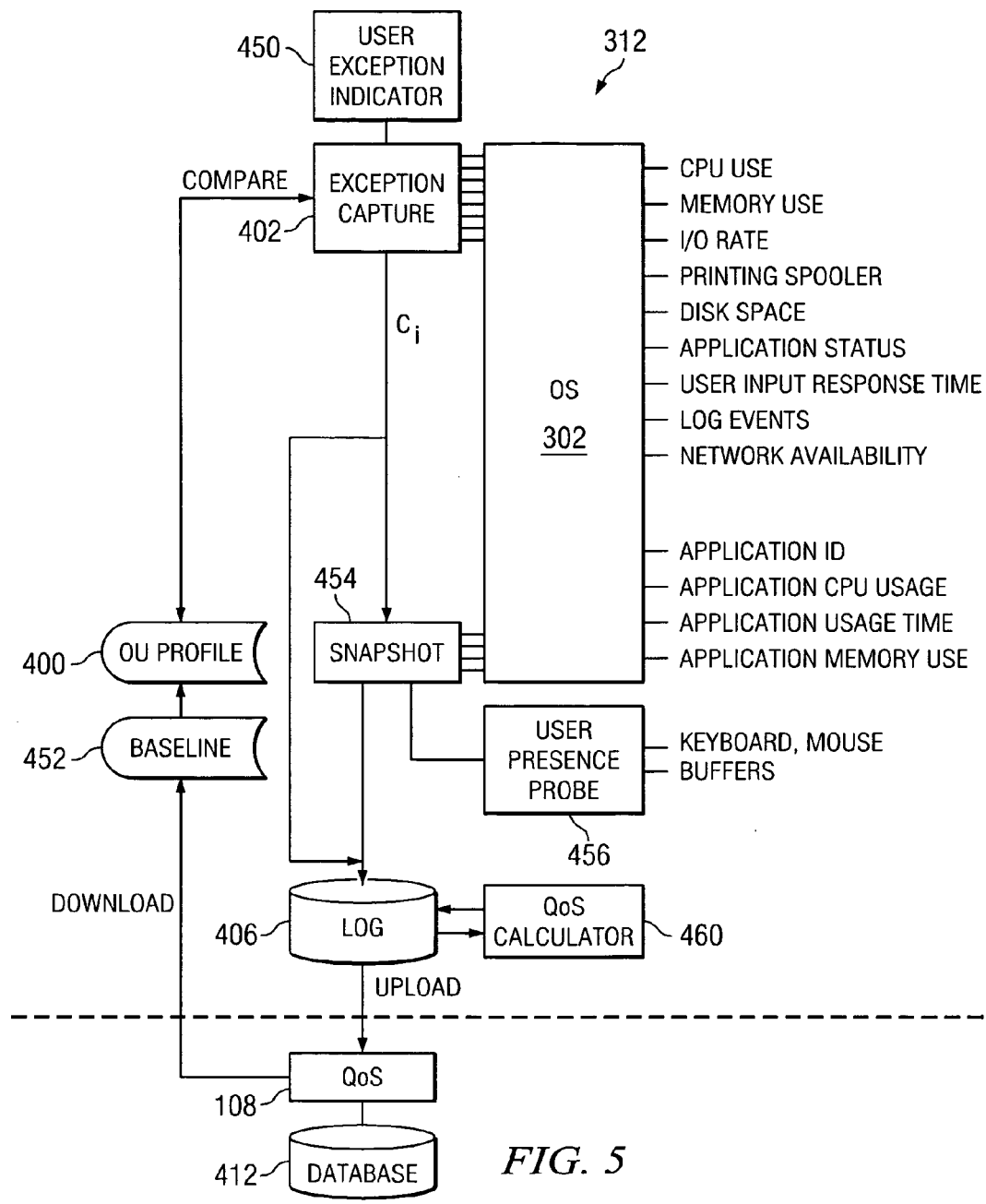
FIG. 5 is a more detailed block diagram of a QoS module according to the invention, showing functional components and data flows to and from the components.

FIG. 5 illustrates the functional components of the Quality of Service module 312 in more detail. The QoS 312 module includes an exception capture component 402 having as its function the declaration or attribution of an exception C. Component 402 does this by periodically monitoring various measurements of system performance. It obtains most of these data by executing calls through the operating system 302. The information that it periodically obtains includes network availability, log events, printing spooler status and printer availability, CPU usage, memory usage, input/output rate, and response time to a user command or input. In one embodiment, the recorded I/O rate can simply be the rate of writes to and reads from the hard disk(s) 226 of IAP 104; in conventional PCs, most of the I/O activity occurs to these devices. A large I/O rate indicates that the executing processes have had to use memory resources other than that made available by the system RAM, typically a condition which is sought to be avoided. Therefore, a high I/O rate to the hard disk(s) is indicative of a degradation in system performance. A related metric is paging. Some paging is necessary because it is often the case that the operating system plus the running applications use an amount of memory which exceeds the physical memory present. In one embodiment the paging rate is also captured.

Exception capture component 402 also accepts inputs from a user exception manual indicator 450. In the illustrated embodiment, the operational user can decide that the computer operation is in less than optimum condition and signal to the network that he or she believes that its performance has been degraded. Through indicator 450, the user can write an exception C to the exception capture component 402, together with an indication of its severity (yellow, orange, red, black).

The exception capture component 402 takes these data and compares them against respective criteria stored in the OU profile. The OU profile 400 also includes baseline performance data 452 for each of the software applications capable of running on IAP 104, and exception capture component 402 will declare an exception if the performance of any running application deviates too far from baseline values. An exception will also be declared if one of the monitored IAP functions or conditions is found to have entered into any of several states each indicative of degraded performance (e.g., yellow, orange, red, black).

Once the exception capture component 402 has declared an exception $C_i$, this fact is communicated to a snapshot module or component 454. The snapshot component 454 uses the instance of an exception as an interrupt and takes a snapshot of the applications then running on the IAP 104 and their use of system resources. These data are written to local disk 406.

Responsive to receiving an instance of an exception, snapshot component 454 will also read the status of a user presence probe 456 which runs a clock from the last time the user operated a keyboard, mouse or other user input device. The probe 456 toggles a bit between "unattended" and "attended" status. If the clocked time is sufficiently long, the user presence probe 456 times out, decides that the user is not present and sets an "unattended" status; if the last recorded time of user input is relatively recent, the user presence probe will be in an "attended" status. A new input from the keyboard or mouse will reset status from "unattended" to "attended" and restart the attendance clock. This presence or absence of the user is communicated as one of the factors $Fw_{i,j}$ to log 406 and preferably is used in the calculation of the QoS index.

The record 406 accumulates these exceptions through the day, and organizes them into predetermined intervals, such as fifteen-minute intervals. For each such interval there is also recorded the presence or absence of a user and the time of day. Database 406 also records certain circumstances relating to the exception, such as the type of condition, function and/or application triggering the exception. As will be detailed below, these circumstances are used to weight the importance of each exception in the calculation of a quality of service (QoS) index by QoS calculator 460. QoS indices for both the IAP as a whole and certain ones of the applications running on the IAP are likewise written to the local disk 406.

Figures 6, 7:
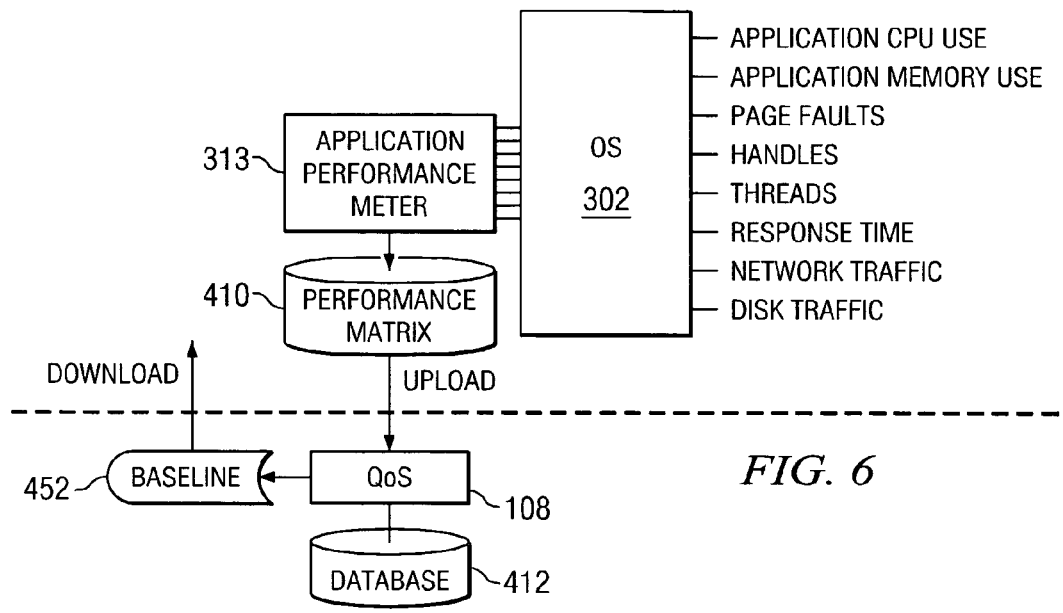
FIG. 6 is a detailed block diagram of an application performance meter according to the invention.
FIG. 7 is a table showing a representative selection of operational user (OU) profiles and their exception weighting factors.

At predetermined intervals, such as once a day, the contents of the local QoS database 406 are uploaded to the network QoS database 412. The server 108, based on application performance data (see FIG. 6), determines a normal operations baseline and downloads the parameters of this to the local IAP 104 and more particularly incorporates this baseline into OU profile 400. FIG. 6 provides more detail on application performance meter 313. At predetermined intervals, such as every fifteen minutes, it gathers data on each software application then running on IAP 104. In the illustrated embodiment, these data include application use of CPU cycles and memory, and numbers of page faults, handles and threads. In a simplified embodiment the numbers of page faults, handles and threads are not recorded and the invention instead relies on its measurement of memory use alone rather than in combination with these other parameters, which have a high correlation to an amount of memory use. Meter 313 also records the application's response to user input, network traffic and disk traffic. These data are preferably obtained through operating system 302. The resultant data are written to a performance matrix 410. At predetermined intervals, such as once a day, the performance matrix 410 is uploaded to QoS server 108 and database 412. The performance data are used to derive baseline application performance criteria 452, which are periodically downloaded to each IAP 104.

The operational user profile 400 is one of a set of such profiles stored on QoS server 108. Representative profiles are illustrated in the table shown in FIG. 7. Each IAP user or "operational user" is assigned to one of the profiles stored on server 108. At least one selected profile is installed locally on each IAP or workstation 104 as it is added to the system. If an IAP 104 has two or more users of different types, two or more profiles will be installed. The profile 400 defines the parameters or factors against which performance will be judged. Shown here is a representative set of factors to be applied to any raw or unweighted exception. These include event type, which can be CPU, memory, network, I/O or response time; time of day and day of week factors; and, for those exceptions caused by application malfunction, application type. While any number of operational user profiles may be stored by server 108, most businesses will require between two and five types.

In the example shown in FIG. 7, three user types are given. A user type I might be the average desktop user. Such a user will work during normal business hours and use his or her desktop computer for normal office applications, such as word processing, email and spreadsheets. User types 2 and 3, on the other hand, are meant for users who have a more mission-critical role. These users may be customer support representatives, tellers or an order desk. The weighting of the factors in their profile reflects the increased importance of the network, response times and their applications. Further, they work different schedules than the first user type.

A particular workstation, node or IAP can be in one of a plurality of predetermined states of operation, five of which are used in the illustrated embodiment:

| State | Interpretation |
|---|---|
| Green | Completely Operational |
| Yellow | Slightly Degraded |
| Orange | Degraded |
| Red | Not Usable |
| Black | Crashed or Frozen |

The OU profile defines the thresholds used to move between these states based on different factors. Thresholds in the profile may be adjusted to reflect values that may be appropriate for different environments. As discussed above, the system administrator may define different profiles for different types of users. An example of the kind of state information contained in an operational user profile is set forth in the table shown in FIG. 8. A movement into a yellow, orange, red or black (crashed) state is declared as an exception by exception capture component 402 (FIG. 5).

The values of the I/O row in the table are preferably expressed as percentages of the maximum rate achievable for a particular period of time. For example, if the IAP has an I/O rate which is more than 30% of the maximum sustainable I/O rate for more than one minute, this may be predetermined to constitute a yellow condition and an exception. In one embodiment, the exception capture component 402 concerns itself only with writes to and reads from the hard drive or other mass storage device. Sustained intensive I/O activity of this kind is an indication of insufficient RAM for the number of applications running. Further, a high level of I/O activity will cause other operations in the system to slow and will degrade performance of other applications using disk activity.

In FIG. 8, the response time row concerns the time it takes to respond to any user input; for example, when a software application presents a button to the user for him or her to click on, how long does it take for the application to present the next window after the user clicks on the button? The "system crash" factor relates to applications that are off while they should be on, are hanging or have crashed. Finally, in one preferred embodiment, the user may find it useful to manually identify an IAP which is responding in a degraded fashion. This can be used to corroborate other indications of degraded performance, or possibly to identify situations that are not caught by other means.

One of the salient aspects of the invention is the user-centered approach by which the data are gathered and the importance thereof ascertained. As shown in FIGS. 4 and 5, the performance is monitored and in large part problems are assessed at the local level. This direct measurement of the impact of the workstation performance on each user is aggregated to a system-wide impact.

The single metric for QoS or quality of service index is a result of applying a formula with variable weights to the exceptions collected from the IAP. These are weighted to permit varying the importance of the different exceptions. Once the weighting has been established based on each installation's requirements and goals, a QoS metric is produced as a reliable, repeatable index of IAP performance. QoS indices for each IAP or workstation can be used to create other QoS indices for aggregate work groups, departments, locations, organizations and/or enterprise performance. The QoS index permits the comparison of IAPs, or groups of IAPs, to each other. Since the QoS index is calculated for each of several times and is normalized to remove effects caused by differences in time periods over which different events are measured, the index may be compared to indices calculated for different lengths of time. Since a QoS metric is also calculated for each application individually on each IAP (a calculated QoS is attributed to the IAP in its entirety and is also distributed to each of several suspect software applications then running on it), levels of service by application can be ascertained across IAPs, time periods, and groups.

A more detailed process flow of the exception capture and "snapshot" components of the local QoS application 312 is shown in FIG. 9. After an operation metric is compared with a respective criterion, benchmark or threshold stored in the OU profile 400 (FIGS. 4 and 5) an exception and interrupt are declared at 600. The exception capture component 402 periodically monitors several functions and conditions of the IAP (see FIG. 5), and compares the sensed performance levels with respective criteria stored in the OU profile 400. The kind and severity of the exception is logged at step 602 to local disk 406; the exception can be a change in privilege or user states respecting the CPU, the amount of memory in use, I/O rates, accessibility to printing, the amount of disk space which remains available to user, an application crash, an entire system crash, a delayed response time, or a change of state regarding the availability of the network in general. The occurrence of an exception also prompts, at step 604, the snapshot component 458 of the QoS module 312 to take a snapshot of the applications which are presently running on the IAP, and the user presence probe 456 determines, through analysis of user interface inputs (keyboard, mouse) whether the user is present. This task list snapshot is also transferred to the log 406.

Hence, the state (green, yellow, orange, red or black) of the IAP is maintained by the QoS module 312 and a log entry records the time and state change each time a change occurs. At the same time, a snapshot of activity tasks and their resources is taken and stored on the local machine.

Figure 10:
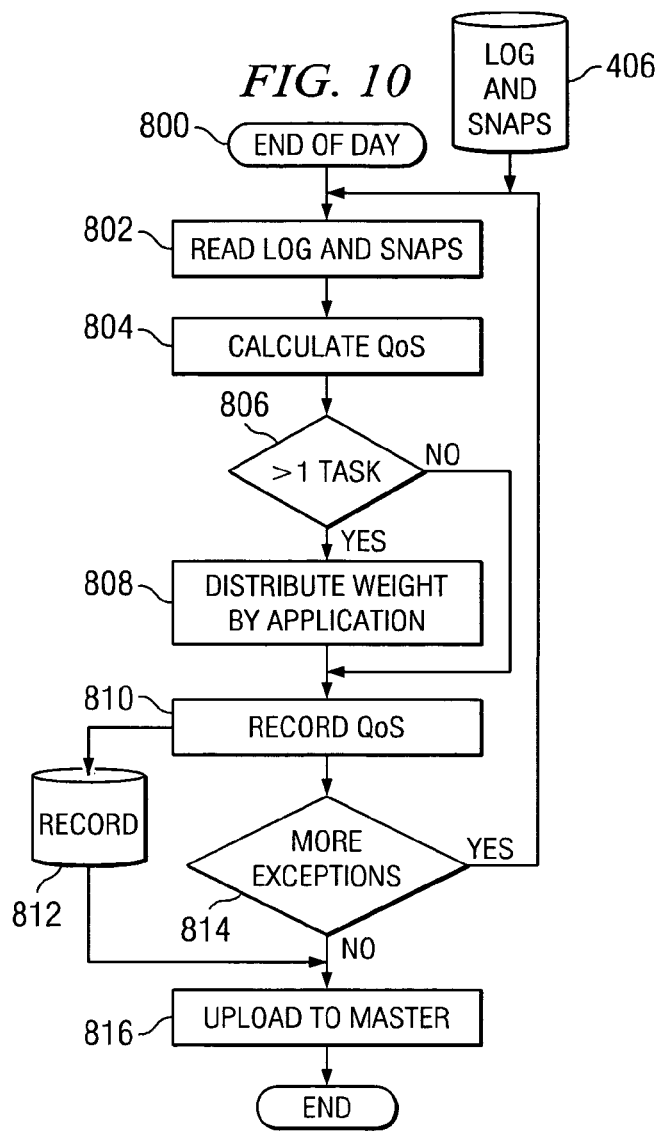
FIG. 10 is a flow diagram showing calculation and uploading of QoS indices and related system snapshots.

FIG. 10 shows the workflow of the larger QoS system. At the end of a predetermined period such as an entire day 800, the QoS module 312 reads the log and snapshots 406 at step 802. At step 804, the QoS application calculates the QoS for the first interval in the record which contains at least one exception C. At decision point 806, the QoS monitor asks whether or not more than one task or application is being performed by the IAP. In the instance that more than one task is being performed, the QoS value derived from the interval in question is distributed among suspected applications at step 108 to create several QoS application indices.

In step 808, the record of applications running at the time of the exception is inspected, together with the amount of memory and/or other system resource(s) being used by each such application. In the illustrated embodiment, the top three memory-users are flagged. The QoS index as calculated for the IAP and for each implicated application is recorded at step 810 to a record 812. At step 814, if there is a further interval containing at least one exception, the procedure returns to step 802, at which data concerning the next interval are read and processed. In the illustrated embodiment QoS indices for the whole IAP, and for suspect ones of running applications, are calculated for each 15-minute interval of time during the day, producing for that day an array of QoS indices for the IAP and a matrix of QoS indices for each of the most prominent ones of the software applications running at any point that day. At step 816, the QoS values for the day are uploaded to server 108 for storage in the database and reporting.

As described above, once a raw, untreated exception C has been attributed and a value assigned according to its severity, it is weighted by appropriate ones of the weight factors Fw read from the operational user profile, in the one embodiment taking into account the following factors: kind of event, which can be a service interruption or deterioration event; duration of the service interruption or deterioration event; presence or absence of the user at the time of the event; hour when the event occurred, with the event-happening during open business hours being considered to be more severe than one occurring when the business is closed; day when the event occurred, with a similar emphasis placed on days on which the enterprise is open for business; a system application event (more severe) or a user application event (less severe); and whether the involved application is critical or noncritical. Other weighting schemes can be employed, using fewer or more factors, different factors, and/or different weights.

In the illustrated embodiment, a QoS index is calculated for an IAP for each of a predetermined number of intervals, which in the illustrated embodiment are each fifteen minutes. All sensed exceptions or state changes occurring within the interval are aggregated to the QoS index for that period. A QoS index is assigned to every state change which occurs on an IAP. The state change is weighted by all applicable factors as a function of the user type assigned to the user of the IAP. The sum of all of the weighted state changes is divided by the number of minutes for the period for which the calculation is made, to arrive at a normalized index which can be compared with an index calculated for a different event or events, which may have occurred over a shorter or longer period, another application or another IAP. The calculation can be represented by the formula:

$$QoS = \frac{\sum_{i=1}^{n} C_i(Fw_1 * Fw_2 * Fw_3 \ldots * Fw_m)}{T_{min}}$$

In the above equation, each exception $C_i$ is assigned a base value depending on its color state. According to one embodiment, yellow is given a base value of 100, orange 200, red 500 and black 2000. A "green" condition is not considered an exception (or alternatively may be considered to have a base value of zero). $Fw_1 \ldots Fw_m$ are the weight factors used to modify each one of the exceptions which will vary, according to the OU profile, by user presence, time of day, listed application, duration, and other factors. $T_{min}$ is the interval in minutes for which the QoS index is calculated and during which the exception(s) occurred.

The QoS index thus derived is a number which represents the relative performance of an IAP. The index will not vary as a function of the period over which the exceptions and conditions contributing to it were measured, and therefore can be averaged or compared with the QoS of other IAPs, or groups of IAPs, having QoS indices that were developed over different time periods. Like QoS indices are developed for the different software applications according to an algorithm such as that illustrated in FIG. 10.

Figure 11:
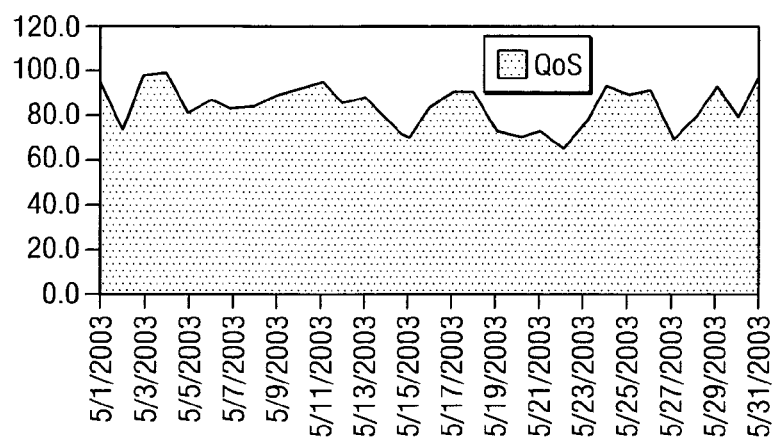
FIG. 11 is a representative graph of a QoS index for one IAP over a number of days.

The FIGURES below give examples of the different report types that can be generated with the collected information. FIG. 11 shows a QoS by day for the month of May for a single IAP. A lower QoS means better performance.

Figure 12:
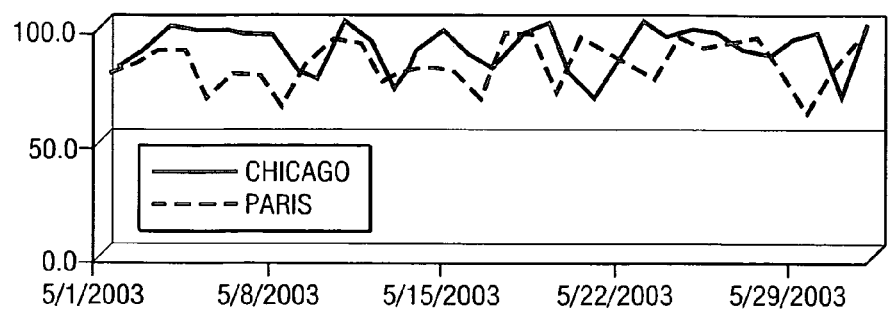
FIG. 12 is a graph over time showing QoS indices for two groups of IAPs.

FIG. 12 compares the QoS by day for groups of IAPs in two different locations, the examples being given being Chicago and Paris.

Figure 13:
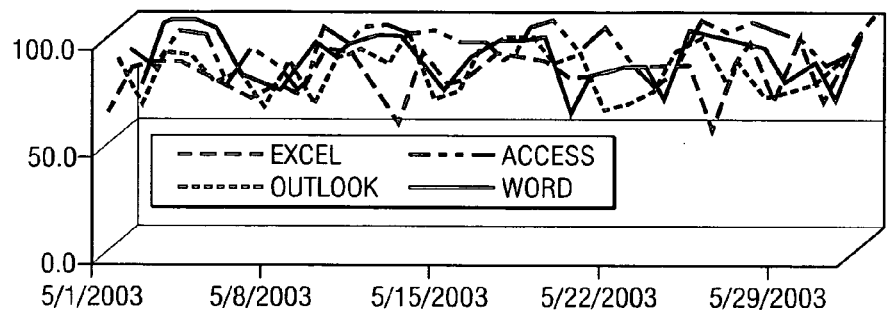
FIG. 13 is a graph over time showing, for a single group of IAPs, a plurality of QoS application indices, one for each of a preselected set of applications.
Figure 14:
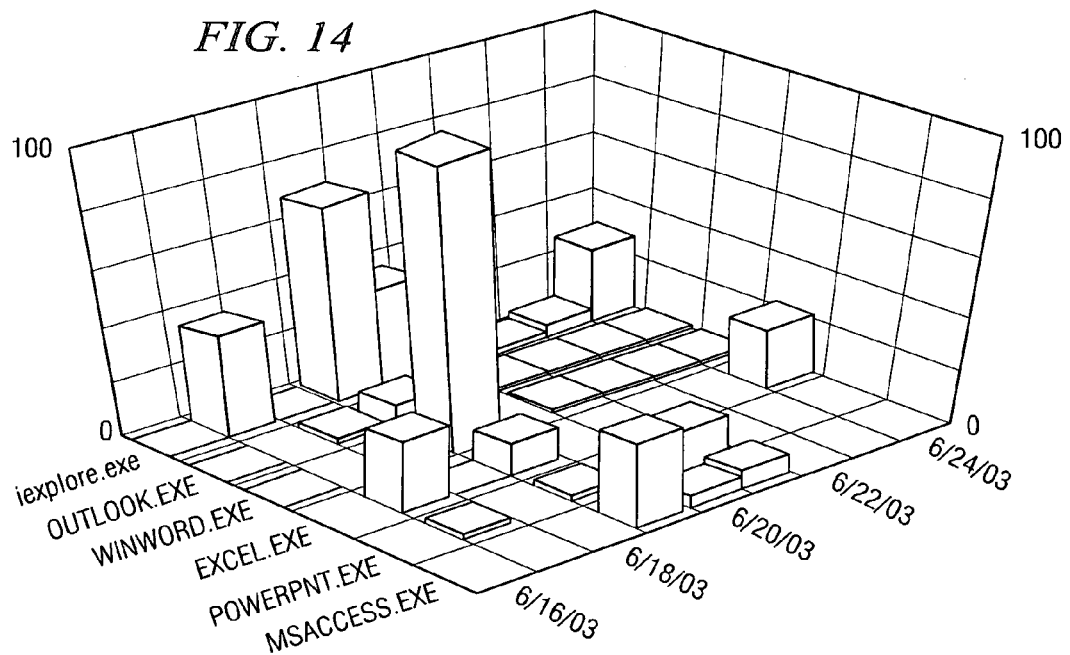
FIG. 14 is a three dimensional bar graph showing QoS application indices by date and by software application.

FIG. 13 shows a QoS comparison for a group of IAPs by software application, with separate quality of service indices being computed in this example for Excel®, Outlook®, Access® and Word®. FIG. 14 is a three-dimensional graphic comparing QoS indices for different applications on different dates.

As noted above, the QoS module 312 monitors user input by the keyboard or mouse. The QoS monitor 312 determines whether a user is present at an IAP by the recency of input or control operations.

This status is associated with the performance of the IAP by time records maintained by the QoS application in which the percentage of attended time is calculated for each fifteen minute time slice by which performance records are maintained. The attended/unattended status is also recorded in each exception record snapshot 604 that is generated by an exception to the OU profile variables loaded on the IAP.

Figure 15:
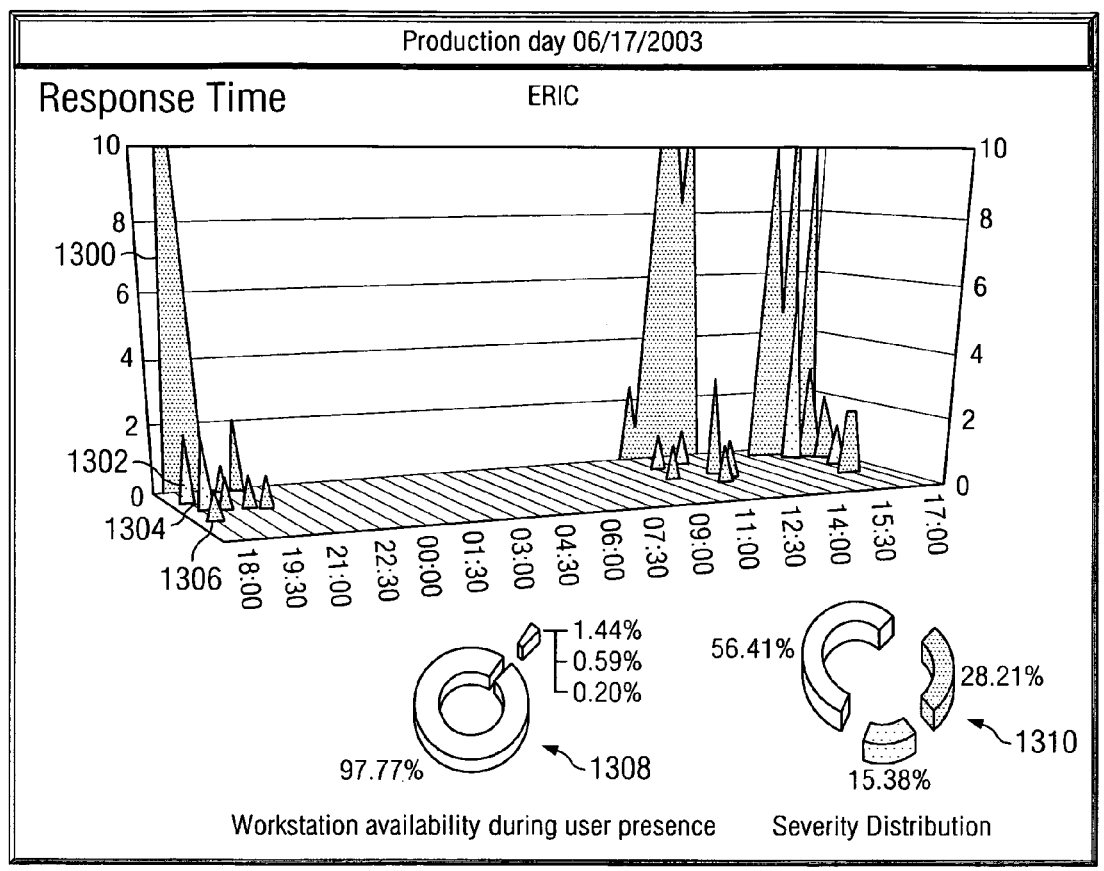
FIG. 15 is a representative user presence graph report.

FIG. 15 shows a report which graphically represents the user presence at an IAP. The large, rear peaks are a portion of a graph 1300 of the percentage of time during each 15 minute interval in which the user was present at the machine. The peaks in front of these show the number of exceptions of yellow (1302), orange (1304), and red (1306) varieties. The graph does not show any black exceptions occurring. As shown, graphics may also be compiled showing, at 1308, relative workstation availability by QoS states during user presence and, at 1310, an exception severity distribution among non-normal states.

Figure 16:
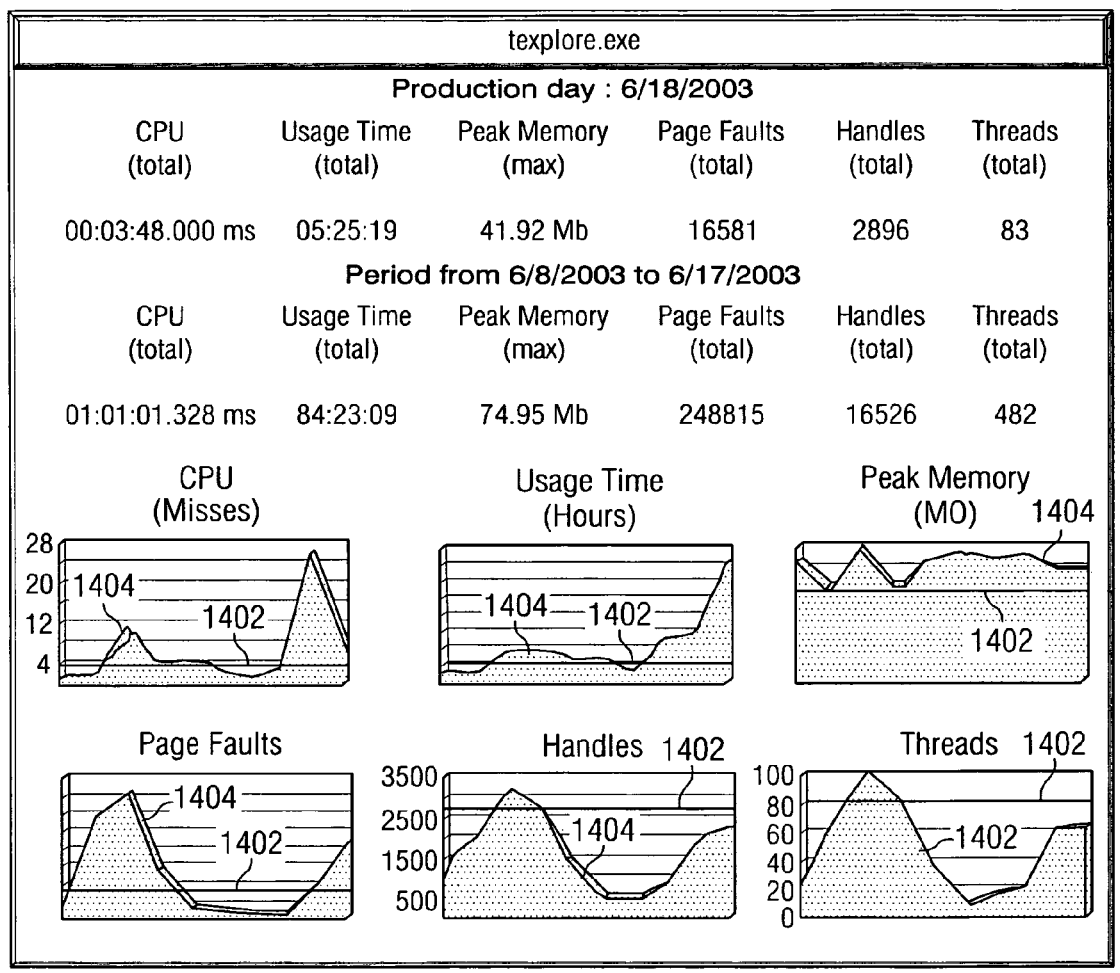
FIG. 16 is a representative application modeling comparison report.

Each application launched at least once on an IAP generates a performance matrix. This matrix records all of the information about the consumption of resources by the application in question and calculates response time, memory consumption, CPU consumption, amount of network and disk traffic, optionally handle usage and possibly other information, such as information of an instantaneous nature (CPU and memory) and of an aggregate nature. This information is stored in the matrix and is used to establish a baseline of normal operation, made available to the QoS exception capture component. Deviations from this baseline by predetermined amounts are considered exceptions and are recorded as exceptions. FIG. 16 is a graphical report showing a comparison between the resource usage for a particular application (iexplore.exe) during a production day (1402) and the usage for previous days (1404).

Each time a change in status occurs, the present invention, through the application matrices, investigates the causes by inspecting and analyzing the list of active tasks. The illustrated embodiment of the present invention may designate up to three causes (tasks or applications) which contributed to a particular penalty or exception. These causes are aggregated at the central database, and reports may be produced that represent the most frequently occurring causes for events. Each running application has recorded for it several measurements of resource usage. In the illustrated embodiment these include CPU cycles, usage time, peak memory, aggregated number of page faults, aggregated number of handles and aggregated number of threads launched by the application in question. The top three users as identified by any of these resource measurements are identified and recorded as candidates for contributing to the exceptions. In an alternative embodiment data for page faults, handles and threads are not kept, more reliance on memory usage measurements being had instead.

These reports may be organized by IAP, groups, locations, IAP types, or other groupings. This provides the capability of producing responsibility reports for both individuals and groups.

Figure 17:
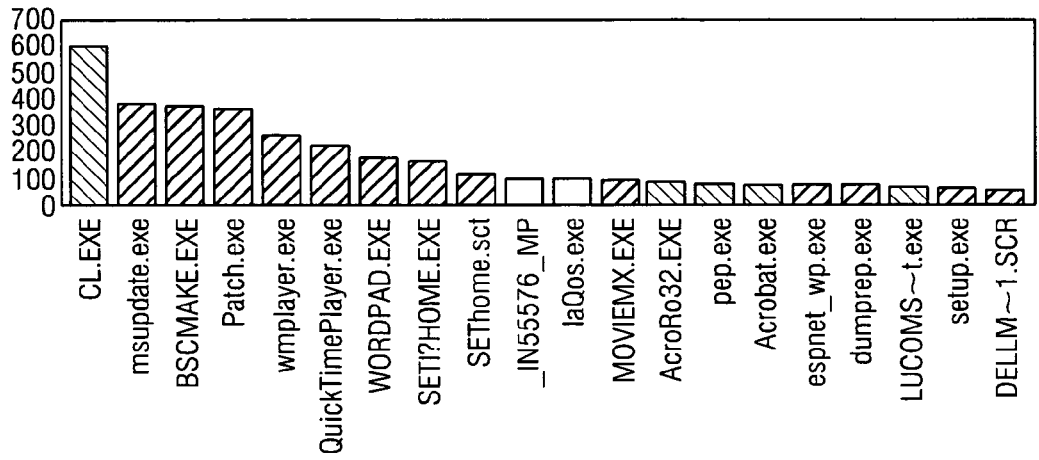
FIG. 17 is a graph using QoS application indices ranking applications according to their relative contributions to problems.
Figure 18:
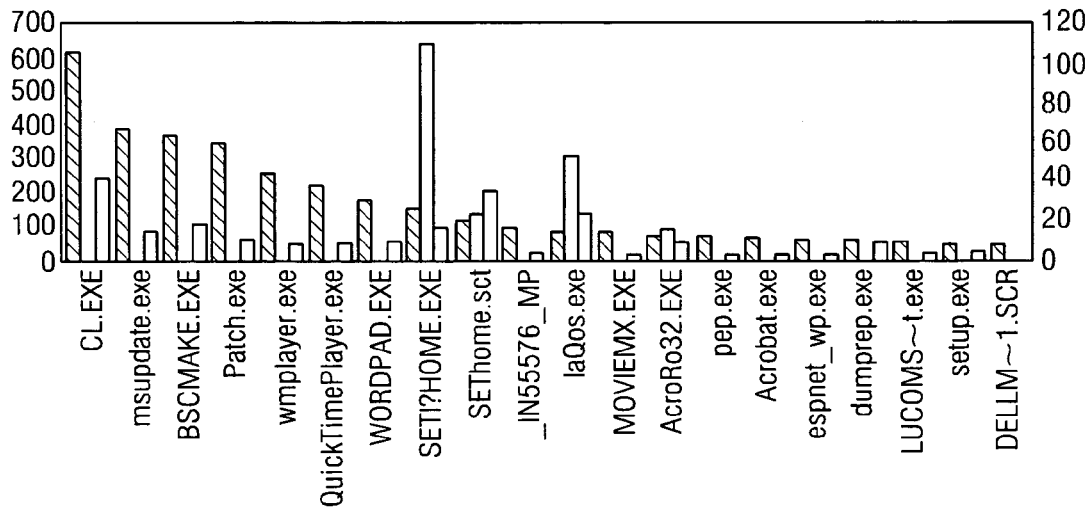
FIG. 18 is a graph showing software applications measured by usage and response times.

At the time that an exception is captured, the snapshot 604 which is taken includes its resource utilization. During QoS processing, as shown in FIG. 17, the responsibility for each application is derived from the event log and its associated snapshot. This provides both application specific QoS indices and information to identify the applications responsible for the exceptions. FIG. 18 is a graph of top problem event contributors for an exemplary case. Each of several software applications or tasks has a measurement for QoS index (penalty), user's time and response time. These metrics can be used by an IT administrator to discern which running software applications are causing the most problems for system performance, and what kinds of problems those are.

In summary, methods, systems, apparatus and prerecorded media for quality of service assessment have been shown and described. Employing a user-centric approach, the present invention monitors each of several parameters on individual IAPs or workstations, and weights exceptions to normal performance according to values read from prerecorded operational user profiles. The quality and service indices are functions of the severity of the sensed exceptions and whether or not the user is present. As compiled, these data provide analytical tools for the IT administrator in determining which software applications require attention.

While an illustrated embodiment of the present invention has been described and illustrated in the appended drawings, the present invention is not limited thereto but only by the scope and spirit of the appended claims.

We claim:

1. A method for assessing the performance of a computer, comprising the steps of:
    storing, on the computer, a profile which defines criteria for a plurality of states for each of a plurality of computer functions or conditions, said states representing degraded levels of performance of progressive severity;
    using a quality of service (QoS) module of the computer to monitor the performance of each of a predetermined plurality of computer functions or conditions;
    using the QoS module to detect each of one or more exceptions of predetermined kinds, an exception being detected when one of the predetermined computer functions or conditions enters into one of said states;
    using the QoS module to record the occurrence of exceptions for a predetermined period of time;
    using the QoS module to attribute a value to the exception based on the sensed state and kind of the exception;
    using the QoS module to aggregate the values of the exceptions for the predetermined period of time according to a predetermined function in order to derive a quality of service index; and
    storing the quality of service index as an indicium of the quality of service rendered by the computer during said predetermined period of time.

2. The method of claim 1, wherein the step of monitoring the predetermined plurality of computer functions or conditions includes monitoring two or more of the following: memory usage, processor usage, the rate of input/output operations, availability of printing, disk space, status of applications running on the computer, status of computer system services, time which the computer takes to respond to user input, events noted by an operating system of the computer, network availability, and a manual entry by a user of the computer that an exception exists.

3. The method of claim 2, wherein the QoS module measures the rate of input/output operations to and from at least one hard drive of the computer.

4. The method of claim 1, and further comprising the steps of:
    programming a general purpose processor of the computer with a computer program in order to create the QoS module.

5. The method of claim 1, and further comprising the steps of:
    when an exception occurs, using the QoS module to automatically determine whether a user is using the computer; and
    weighting the exception in said predetermined function according to whether the user was detected as using the computer.

6. The method of claim 1, and further comprising the steps of:
    when an exception occurs, using the QoS module to determine the time of day;
    using the QoS module to record the determined time of day as attributed to the exception; and
    weighting the exception in the predetermined function as a function of the time of day when the exception occurred.

7. The method of claim 1, and further comprising the steps of:
    when an exception occurs, using the QoS module to ascertain the current day of the week;
    using the QoS module to record the ascertained day of the week as attributed to the exception; and
    weighting the exception in the predetermined function as a function of the recorded day of the week attributed to the exception.

8. The method of claim 1, wherein the computer is capable of running one or more of a plurality of different software applications or tasks available for execution by the computer, the method comprising the further steps of:
    when an exception occurs, using the QoS module to identify which of a predetermined plurality of the software applications or tasks are running; and
    using the QoS module to record which of the plurality of software applications or tasks are running at the time that the exception occurred.

9. The method of claim 1, wherein the computer is a node on a network, the method further comprising the step of uploading a record of QoS indices and related data to a central location for analysis by a system administrator.

10. The method of claim 1, and further comprising the steps of:
   automatically and periodically recording performance data for each software application or task then running on the IAP; and
   using the periodically recorded performance data to heuristically derive the criteria for ones of the predetermined states as a function of the recorded performance data.

11. The method of claim 10, wherein said performance data include data relating to the consumption of IAP resources by the running software applications or tasks.

12. The method of claim 10, wherein said performance data include one or more of the following: CPU usage, memory usage, amounts of network and mass storage usage, handle usage, number of threads and number of page faults.

13. The method of claim 10, wherein the computer is a node in a network including a plurality of computers, said criteria for ones of said states being derived from periodically recorded measurements made at a plurality of IAPs on the network.

14. The method of claim 1, wherein the computer is a node in a network including a plurality of computers usable by different ones of a plurality of users each having an assigned user type, the method further including the steps of:
   determining which user type is currently using the computer;
   comparing the monitored performance of each of the functions or conditions to respective criteria read from a table associated with the user type; and
   determining whether at least one exception exists based on said step of comparing.

15. The method of claim 1, and further comprising the steps of:
   assigning a base numerical value to the exception based on its attributed state; and
   using the base numerical value of the exception in the predetermined function in order to derive the quality of service index.

16. The method of claim 1, wherein the plurality of states for which predetermined criteria are stored include degraded, severely degraded, frozen and crashed.

17. The method of claim 1, wherein the computer is a node on a network including a plurality of computers, the method including the steps of:
   normalizing the quality of service index by dividing the aggregated values of the exceptions by the period of time during which the exceptions occurred; and
   calculating a quality of service index for a group of computers on the network based on quality of service indices of individual computers.

18. A method for assessing the quality of service present on an information access point in a computer network, the method comprising the steps of:
   at the information access point, providing a quality of service module for monitoring respective performance levels of each of a plurality of functions or conditions of the information access point;
   for each of the plurality of functions or conditions, storing predetermined criteria the presence of any of which is indicative of a state of degraded performance;
   declaring an exception when a sensed performance level of a function or condition enters into a respective stored state;
   using the quality of service module to determine whether a user is present at the information access point at the time that the exception occurred;
   weighting the exception with a user presence factor having a value which is a function of whether the user was present at the time the exception occurred; and
   calculating a numerical quality of service index indicative of the quality of service rendered by the computer from one or more of the weighted exceptions.

19. The method of claim 18, and further comprising the steps of: using a probe to declare an attended status when a user has an input at user interface;
   starting a clock from the time that the user made said input;
   determining when the clock reaches a predetermined timeout period;
   declaring an unattended status if no further user input is sensed by the expiration of the predetermined timeout period; and
   restarting the clock and declaring an attended status upon the next occurrence of user input.

20. A method for assessing the quality of service present on an information access point (IAP) in a computer network, comprising the steps of:
   at the IAP, providing a quality of service module for monitoring a plurality of functions or conditions of the IAP;
   at the IAP, storing predetermined criteria the presence of any of which are determinative of an exception to normal operation;
   monitoring the plurality of functions or conditions to determine whether any of said criteria are present;
   using the quality of service module to declare at least one exception when one or more of said criteria are sensed to exist at the IAP;
   using the quality of service module to determine which of a predetermined plurality of software applications were running at IAP at the time the criteria were sensed; and
   using the quality of service module to record the identity of the sensed application(s) and the occurrence of an exception in a log.

21. The method of claim 20, and further comprising the steps of:
   periodically uploading the log to a server;
   compiling, at the server, exceptions and sensed applications to discern patterns in which applications were running at the time that the exceptions occurred; and
   attributing responsibility to one or more of the sensed applications based on the compiled data.

22. The method of claim 20, and further including the steps of:
   calculating a quality of service (QoS) index for an interval during which the at least one exception occurred; and
   distributing the value of the QoS index among ones of the software applications then running to derive a plurality of QoS application indices.

23. The method of claim 22, and further including the steps of:
   at the time the at least one exception occurs, using the quality of service module to determine the amounts of consumption of at least one predetermined resource of the IAP by each of the running applications; and
   distributing the value of the QoS index to a preselected number of the applications consuming the largest amounts of the at least one predetermined resource.

24. The method of claim 23, wherein said at least one predetermined resource is selected from the group consisting of memory and processor usage.

25. Apparatus for assessing the quality of service (QoS) present at an information access point (IAP), comprising:

an operational user profile stored at the IAP, the operational user profile storing predetermined criteria for each of a plurality of states for each of a plurality of predetermined IAP functions or conditions, the states being indicative of different degrees of degraded performance;

an exception capture component of a quality of service (QoS) module of the IAP periodically sensing the performance of each predetermined function or condition of the IAP, comparing the performance to the respective criterion for the function or condition stored in the operational user profile, the exception capture component declaring an exception when a sensed performance of any predetermined function or condition enters into one of said states; and a QoS calculator of the QoS module for calculating a single QoS index for the IAP based on one or more declared exceptions.

26. The apparatus of claim 25, wherein the operational user profile stores a numerical value for each state, said numerical value used by the QoS calculator in calculating the QoS index.

27. The apparatus of claim 26, wherein the operational user profile stores a plurality of weighting factors selectively used by the QoS calculator to modify the numerical value of the state of each declared exception, the weighting factors applied as a function of the kind of exception, the identity of the user and/or the circumstances under which the exception occurred.

28. The apparatus of claim 27, wherein the QoS module further includes a user attendance probe to detect whether the IAP is in attended or nonattended status, the attended/nonattended status being used to determine one of the weighting factors applied to each declared exception.

29. The apparatus of claim 27, wherein the QoS module further determines the time of day when the exception occurred, the time of day being used to determine one of the weighting factors applied to each declared exception.

30. The apparatus of claim 27, wherein the QoS module further determines the day of the week when the exception occurred, the day of the week being used to determine one of the weighting factors applied to each declared exception.

31. The apparatus of claim 25, wherein said predetermined functions or conditions of the IAP include two or more of: memory usage, processor usage, a rate of input/output operations, availability of printing, disk space, status of applications running on the IAP, status of computer system services, time which the computer takes to respond to a user input, status of a network to which the IAP is connected, events noted by an operating system of the IAP, and a manual entry by the user of the IAP that an exception exists.

32. The apparatus of claim 31, wherein the exception capture component of the QoS module monitors input/output operations to and from at least one hard disk of the IAP.

33. The apparatus of claim 25, wherein the IAP is a workstation.

34. The apparatus of claim 25, wherein the quality of service module is created by programming a general purpose processor of the IAP.

35. The apparatus of claim 25, wherein the quality of service module further includes a snapshot component which, at the time that an exception is declared, records which of a predetermined plurality of applications is running on the IAP, the snapshot component recording the identity of ones of the running applications to a log together with the fact that an exception has occurred.

36. The apparatus of claim 35, wherein the snapshot component determines the amount of at least one IAP resource that each of the running applications is using, the QoS module recording the identities of the highest users of said resource among said running applications to the log.

37. The apparatus of claim 35, wherein the predetermined plurality of applications is stored locally on the IAP.

38. The apparatus of claim 25, wherein the exception capture component records the time at which the exception occurred, the QoS index calculator calculating the QoS index as normalized for the period of time in which said one or more exceptions occurred.

39. The apparatus of claim 25, wherein an application performance meter periodically senses and records performance data of each of a plurality of predetermined applications or tasks then running on the IAP, a QoS baseline calculator heuristically calculating ones of said predetermined criteria for said states based on the recorded performance data of said predetermined applications or tasks.

40. The apparatus of claim 39, wherein said recorded performance data include data concerning each application's or task's consumption of IAP resources.

41. The apparatus of claim 39, wherein said performance data indicate one or more of the following: CPU consumption, memory consumption, time to respond to user input, amounts of network and disk traffic, handle usage, number of threads and number of page faults.

42. The apparatus of claim 39, wherein the IAP is a node on a network which also includes a QoS server, the recorded performance levels of each of a plurality of IAPs periodically uploaded to the QoS server, said QoS baseline calculator resident at said QoS server and calculating said predetermined criteria as a function of the recorded performance levels of each of a plurality of said applications or tasks, said QoS baseline calculator periodically downloading said predetermined criteria to a plurality of IAPs on the network.

43. Apparatus for assessing the quality of service delivered by an information access point (IAP) to a user, comprising:

an exception capture component of a quality of service (QoS) module for monitoring each of a plurality of predetermined functions or conditions of the IAP, the exception capture component comparing a sensed performance level of each predetermined function or condition against respective criteria stored on the IAP, each stored criterion defining a state of degraded performance for a respective function or condition, the exception capture component declaring an exception if a sensed performance level of any of the predetermined functions or conditions enters into one of said states;

a user presence probe of the QoS module for determining the presence or absence of a user at the IAP at the time for which the exception is declared; and a quality of service calculator of the QoS module coupled to the exception capture component and the user presence probe for calculating a quality of service index as a function of the exception and whether the user is present at the time the exception occurred.

44. The apparatus of claim 43, wherein the user presence probe declares an attended status upon sensing a user input and resets a clock at that time, the probe declaring an unattended status if no further user input is received within a predetermined period of time, the user presence probe reestablishing an attended status upon sensing the next user input.

45. The apparatus of claim 43, wherein the predetermined functions or conditions include at least two from the following: memory usage, processor usage, rate of input/output operations, disk space, status of applications running on the IAP, status of computer system services, time with which the IAP takes to respond to a user input, events noted by an operating system of the IAP, availability of a network to which the IAP is connected, printing availability, and manual entry by a user of the IAP that an exception exists.

46. The apparatus of claim 43, wherein the IAP is a workstation.

47. The apparatus of claim 43, wherein the QoS module is a general purpose processor programmed by a QoS computer program.

48. Apparatus for assessing the quality of service delivered by an information access point (IAP), comprising:
a quality of service (QoS) module for periodically monitoring performance levels of each of a plurality of predetermined functions or conditions of the IAP;
an application performance meter for periodically recording performance data for each software application or process running on the IAP;
a QoS baseline calculator coupled to the application performance meter for periodically receiving the recorded application performance data, the QoS baseline calculator heuristically calculating a plurality of baseline application performance criteria based on the recorded application performance data, the baseline application performance criteria being made available to an exception capture component of the QoS module for comparison with the sensed application performance levels, the exception capture component of the QoS module declaring an exception upon a sensed application performance level deviating from a respective application performance criterion by more than a predetermined amount.

49. The apparatus of claim 48, wherein the IAP is a node in a network which also includes a QoS server, the QoS server having mounted thereon the QoS baseline calculator, the application performance meter of the IAP periodically uploading the recorded application performance data, the QoS baseline calculator receiving the recorded application performance data from each of a plurality of IAPs on the network and calculating the baseline performance criteria based on the recorded application performance data from multiple IAPs, the QoS baseline calculator downloading the application baseline criteria to each of a plurality of IAPs on the network.

50. The apparatus of claim 48, wherein the IAP is a workstation.

51. The apparatus of claim 48, wherein the application performance meter is a general purpose processor of the IAP which has been programmed with a computer program.

52. Apparatus for assessing the quality of service (QoS) present at an information access point (IAP), comprising:
a QoS module of the IAP for periodically monitoring performance levels of each of a plurality of predetermined functions or conditions of the IAP;
a file of predetermined performance criteria against which respective performance levels of the functions or conditions of the IAP may be compared by the IAP, each stored criterion indicative of a state of degraded performance on the part of one of said predetermined functions or conditions, the IAP declaring an exception whenever at least one of the predetermined functions or conditions enters into one of said states; and
the IAP running one or more of a plurality of predetermined software applications, the identities of the software applications then running being noted by a snapshot component of the QoS module at the time that an exception is declared, ones of said identities being recorded in an exception log coupled to the QoS module.

53. The apparatus of claim 52, wherein the QoS module further includes a QoS calculator which calculates a QoS index as a predetermined function of the sensed states associated with one or more exceptions, the QoS calculator further calculating a QoS application index for each of said software applications for which the identity has been recorded in the exception log, the QoS calculator distributing the value of the QoS index to selected ones of the applications then running to derive one or more respective QoS application indices for the last said applications.

54. The apparatus of claim 53, wherein the snapshot component of the QoS module reads, at the time that it notes the identities of the applications then running, the amount of at least one IAP resource being consumed by each noted application, the largest consumers of said at least one IAP resource being selected by the QoS module for recordation in the exception log.

55. The apparatus of claim 53, wherein the snapshot component determines, at the time that an exception is declared, one or more of the following for each application then running: memory usage and CPU usage.

56. The apparatus of claim 53, wherein the IAP is a node on a network to which a QoS server and at least one other IAP having a QoS module are connected, the QoS modules of the IAPs periodically uploading the QoS application indices to the QoS server, the QoS server deriving QoS application indices across a plurality of IAPs from the QoS application indices uploaded from the IAPs.

57. The apparatus of claim 52, wherein the QoS module is a general purpose processor of the IAP which has been programmed with a QoS computer program.

58. The apparatus of claim 52, wherein the IAP is a workstation.

59. The apparatus of claim 52, wherein the predetermined functions or conditions monitored by the QoS module include at least two of the following: memory usage, processor usage, rate of input/output operations, availability of printing, disk space, status of IAP system services, status of applications running on the IAP, time which the IAP takes to respond to user input, events noted by an operating system of the IAP, network availability and a manual entry by a user of the computer that an exception exists.

60. A machine-readable medium preprogrammed with a computer program with instructions which, when executed by a processor of a computer, creates a quality of service (QoS) module which performs the following steps:
periodically monitoring performance levels of each of a plurality of predetermined functions or conditions of the computer;
comparing the sensed performance levels to stored criteria each indicative of a state of said functions or conditions, the states for which said criteria are stored each defining a level of degraded performance for a respective function or condition;
declaring an exception whenever at least one of the monitored functions or conditions enters into one of said states; and calculating, as a function of all such declared exceptions occurring within a predetermined period of time, a QoS index indicative of the relative operational state of the computer during that period of time.

61. The medium of claim 60, wherein the functions or conditions include at least two of the following: processor usage, memory usage, rate of input/output operations, availability of printing, disk space, status of applications running on the computer, status of computer system services, time which the computer takes to respond to a user input, status of a network to which the computer is connected, events noted by an operating system of the computer, and a manual entry by the user that an exception exists.

62. The medium of claim 61, wherein the functions or conditions include a rate of input/output operations to one or more hard disks on the computer.

63. The medium of claim 61, wherein predetermined criteria are stored for each of a plurality of states for each of the monitored functions or conditions, the states representing different degrees of degradation in performance.

64. The medium of claim 63, wherein the QoS module attributes a stored base value to each of the states, each declared exception having attributed to it one of the base values according to the state which the respective function or condition has entered and being weighted by one or more factors according to kind of exception, the identity of the user and/or the circumstances under which the exception occurred.

65. The medium of claim 64, wherein the factors include a factor for the time of day during which the exception occurred.

66. The medium of claim 64, wherein the factors include a factor for the day of the week during which the exception occurred.

67. The medium of claim 61, wherein the QoS index is normalized for the period of time for which it is calculated.

68. A machine-readable medium preprogrammed with a computer program with instructions which, when executed by a processor of a computer, creates a quality of service (QoS) assessment module which performs the following steps:
   declaring an exception at a time when the performance of one of a predetermined number of computer functions or conditions enters into a state indicative of a degraded level of performance;
   determining whether, at such time, a user was present at the computer;
   attributing one of a plurality of stored base values to the exception based on its kind and severity;
   weighting the base value of the exception with a value indicative of the presence or absence of the user at the computer at such time; and calculating, as a function of all such weighted exceptions occurring within a predetermined period of time, a quality of service index indicative of the relative operational state of the computer.

69. The medium of claim 68, wherein the QoS assessment module further includes a user attendance probe which performs the following steps:
   counting a period of time since the last sensed user input;
   if the counted period of time exceeds a predetermined limit, declaring the computer to be in an unattended status; and
   declaring the computer to be in an attended status if a new user input is sensed.

70. The medium of claim 68, wherein the functions or conditions include at least two of the following: processor usage, memory usage, rate of input/output operations, availability of printing, disk space, status of applications running on the IAP, status of computer system services, time which the computer takes to respond to a user input, status of a network to which the computer is connected, events noted by an operating system of the computer, and a manual entry by a user of the computer that an exception exists.

71. A machine-readable medium preprogrammed with a computer program having instructions which, when executed by a processor of a computer, creates a quality of service assessment module that performs the following steps:
   periodically monitoring performance levels of each of a plurality of predetermined computer functions or conditions;
   comparing the performance levels to stored, predetermined criteria which define predetermined states for each of the functions or conditions, each of said states indicative of a degraded level of performance for a respective function or condition;
   declaring an exception whenever a monitored performance level of one of the functions or conditions is found to have entered into one of said states;
   for the time for which the exception is declared, determining which of a predetermined plurality of software applications was running on the computer; and
   recording the exception as referenced to the identities of ones of the software applications.

72. The medium of claim 71, wherein the quality of service assessment module performs the following additional steps:
   for the time for which the exception is declared, determining which of the running ones of the identified computer software applications were the highest users of at least one kind of computer resource; and
   tracking responsibility for the exception by recording the identities of said highest users among the running software applications together with the fact that an exception has occurred.

73. The medium of claim 71, wherein the quality of service assessment module performs the following additional steps:
   calculating, for a predetermined period of time, a quality of service index as a function of all exceptions recorded for the period of time; and
   distributing the quality of service index to each of said ones of said software applications to derive one or more respective QoS application indices.

74. The medium of claim 71, wherein the predetermined functions or conditions include at least two of the following: processor usage, memory usage, rate of input/output operations, availability of printing, disk space, status of applications running on the IAP, status of computer system services, time which the computer takes to respond to a user input, status of a network to which the computer is connected, events noted by an operating system of the computer, and a manual entry by the user of the computer that an exception exists.

75. The medium of claim 71, wherein predetermined criteria for each of several states are stored for each of said functions or conditions, the states being indicative of different levels of degradation of performance.

76. A machine-readable medium preprogrammed with a computer program having instructions which, when executed by a processor of a computer, creates a quality of service (QoS) assessment module and an application performance meter which perform the following steps:

using the application performance meter to periodically record performance data for one or more software applications then running on the computer;

using the recorded performance data to derive a set of baseline performance criteria for each of the software applications;

using the QoS module to monitor performance levels of software applications running on the computer;

using the QoS module to compare the monitored performance levels to respective ones of the baseline performance criteria; and declaring an exception whenever at least one of the monitored performance levels departs from a respective performance criterion by more than a predetermined amount.

* * * * *